(12) United States Patent
Ward et al.

(10) Patent No.: US 9,535,552 B2
(45) Date of Patent: *Jan. 3, 2017

(54) SENSOR MANAGED APPARATUS, METHOD AND COMPUTER PROGRAM PRODUCT

(71) Applicants: Sony Mobile Communications Inc., Tokyo (JP); Sony Corporation, Minato-ku (JP)

(72) Inventors: Anatol Ward, Tokyo (JP); Kouichiro Takashima, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,987

(22) Filed: Jan. 29, 2015

(65) Prior Publication Data
US 2015/0138156 A1    May 21, 2015

Related U.S. Application Data

(63) Continuation of application No. 13/359,544, filed on Jan. 27, 2012, now Pat. No. 8,988,386.

(51) Int. Cl.
| | |
|---|---|
| G06F 3/044 | (2006.01) |
| G06F 1/32 | (2006.01) |
| G06F 3/01 | (2006.01) |
| G06F 21/32 | (2013.01) |
| G06F 3/0488 | (2013.01) |
| G06F 21/36 | (2013.01) |

(52) U.S. Cl.
CPC ............ *G06F 3/044* (2013.01); *G06F 1/3262* (2013.01); *G06F 3/016* (2013.01); *G06F 3/04886* (2013.01); *G06F 21/32* (2013.01); *G06F 21/36* (2013.01)

(58) Field of Classification Search
None
See application file for complete search history.

(56) References Cited

U.S. PATENT DOCUMENTS

| | | |
|---|---|---|
| 6,668,081 B1 | 12/2003 | Ilan et al. |
| 7,004,394 B2 | 2/2006 | Kim |

(Continued)

*Primary Examiner* — Kenneth B Lee, Jr.
(74) *Attorney, Agent, or Firm* — Oblon, McClelland, Maier & Neustadt, L.L.P.

(57) ABSTRACT

An apparatus, method and computer program product provide a simplified method for unlocking an electronic device that uses soft keys, such as capacitive touch keys, or proximity detection areas and patterns. The keys may be implemented in the form of areas of a sensor, and a processing circuit observes a touch pattern (or proximity pattern, or characteristic pattern such as a capacitance pattern of a user's finger) and compares the same with the registered pattern to determine if there is a likeness. In doing so, the electronic device is operated at a low power state, and in that low power state observes whether a predetermined pattern is observed and when it is, unlocks the electronic device for interaction with a user at a fully operational state. By operating in the low power state while waiting to observe a predetermined pattern before unlocking the user interface, the device does not waste power on false positive detections, and allows for convenient wakeup and accessibility by a user.

19 Claims, 13 Drawing Sheets

(56) References Cited

U.S. PATENT DOCUMENTS

| | | | |
|---|---|---|---|
| 7,558,600 B2 | 7/2009 | Kang | |
| 7,562,241 B2 | 7/2009 | Nurmi | |
| 8,988,386 B2* | 3/2015 | Ward | G06F 1/3262 |
| | | | 345/174 |
| 2011/0187673 A1* | 8/2011 | Yin | G06F 3/044 |
| | | | 345/174 |
| 2012/0071149 A1* | 3/2012 | Bandyopadhyay | G06F 1/1643 |
| | | | 455/418 |
| 2013/0050090 A1* | 2/2013 | Stewart | G06F 3/04886 |
| | | | 345/168 |
| 2013/0106765 A1* | 5/2013 | Beecher | G06F 3/044 |
| | | | 345/174 |

* cited by examiner

SENSOR MANAGED APPARATUS, METHOD AND COMPUTER PROGRAM PRODUCT

CROSS REFERENCE TO RELATED APPLICATIONS

This application is a Continuation of and is based upon and claims the benefit of priority under 35 U.S.C. §120 for U.S. Ser. No. 13/359,544, filed Jan. 27, 2012, the entire contents of which is incorporated herein by reference.

BACKGROUND

1. Field of the Disclosure

The present disclosure relates to apparatuses, methods and computer program product that use a single action to change an electronic device to an unlocked operational mode from a lower power locked mode.

2. Description of the Related Art

The "background" description provided herein is for the purpose of generally presenting the context of the disclosure. Work of the presently-named inventors, to the extent it is described in this background section, as well as aspects of the disclosure that may not otherwise qualify as prior art at the time of filing, are neither expressly or impliedly admitted as prior art against the present invention.

More mobile terminals (such as cell phones, including smart phones) are being equipped with touch sensitive screens that replace hardware dome keys, for example. Normally, two or more operations are needed to wake-up and unlock these mobile terminals. FIG. 1 shows a conventional mobile terminal 10 having a touch screen 13 and an analog "home" key 11 disposed on the front of the mobile terminal 10. The home key 11 is often concave so it is not inadvertently pressed and places the mobile terminal 10 in an active state that wastefully draws more power. Some mobile terminals include a mechanical power switch 12, often mounted on the side of the mobile terminal 10.

There are separate ways to wake up and unlock the mobile terminal 10. One way to wake up the mobile terminal 10 is for the user to press the home key 11, and then the user unlocks the device by sliding his finger across an illuminated portion of the touch screen 13. This combination of user interactions wakes up, and subsequently, unlocks the mobile terminal 10. Another technique is for the user to slide the power switch 12 to the ON position, followed by an interaction with the touch screen 13, or perhaps touching of a key, such as the home key 11.

One purpose of having a separate wake up operation from an unlock operation is to avoid inadvertent waking up and unlocking of the mobile terminal 10. Moreover, it is unlikely that a user would accidently actuate the home key and then also swipe the main touch screen 13 in two consecutive actions.

Another feature of some devices is the replacement of analog "dome" keys with capacitive touch keys that are an extension of the touch screen. However, as recognized by the present inventors, without a two step action, the capacitive touch sensor keys too easily, and inadvertently, actuate the mobile device, which would unnecessarily waste battery reserve. Also, keeping the touch sensor active, constantly waiting for a touch event, also draws unnecessary power.

SUMMARY

According to one embodiment, an electronic device includes an interactive display having a sensor that detects user interaction with a sub-portion of the interactive display; and a processing circuit that executes a state change of the interactive display from a low power state to an operational state in response to only one detected user interaction with the electronic device, the user interaction being one of a touch event, a proximity event and a gesture.

An aspect of this embodiment is that the sub-portion is disposed at an end portion of the interactive display, and is visually separated from a main display portion of the interactive display by a material that optically covers at least a portion of the sub-portion but not the main display portion.

The device may also include a front lens have an external surface that separates the sensor from an object used to generate the user interaction, wherein the interactive display being a touch panel, and the sensor being a capacitance sensor that is reactive to a touch of the object.

According to an aspect of the embodiment, the one user interaction is a touch event that includes a movement of the object over the front lens while remaining in contact with the front lens.

According to an aspect of the embodiment the sub-portion includes a plurality of soft key regions that includes at least a first soft key and a second soft key, and the touch event includes a movement across the soft key regions that include the first soft key region and the second soft key region.

According to an aspect of the embodiment the processing circuit determines that the first soft key region is included in the touch event before determining that the second soft key region is included in the touch event.

According to an aspect of the embodiment the processing circuit determines the first soft key region is included in the touch event by receiving a signal from the sensor indicating that a change in detected capacitance amount exceeded a predetermined level for a portion of the sensor that corresponds with the first soft key region.

According to an aspect of the embodiment, the device further includes a computer storage medium that has data stored therein describing a preregistered capacitance pattern, wherein the processing circuit performs the state change after determining that a detected capacitance pattern caused by the object matches the preregistered capacitance pattern within a predetermined amount.

According to an aspect of the embodiment the one user interaction is a proximity detection that includes a movement of the object over the front lens without contacting the front lens.

According to an aspect of the embodiment, the device further includes a computer storage medium that has data stored therein describing a preregistered proximity pattern, wherein the processing circuit performs the state change after determining that a detected proximity pattern caused by the object matches the preregistered proximity pattern within a predetermined amount.

According to an aspect of the embodiment the processing circuit performs a cross-correlation operation to determine that a detected proximity pattern caused by the object matches the preregistered proximity pattern within a predetermined amount.

According to an aspect of the embodiment the one user interaction is a multi-point gesture that includes a movement of the object over the front lens.

According to an aspect of the embodiment, the device further includes a feedback mechanism that provides a haptic response when the only one detected user interaction is recognized by the processing circuit as being a user interaction that is associated with a wake up and an unlock instruction.

According to an aspect of the embodiment the feedback mechanism includes at least one of an illumination device, and a tactile sensation device.

In a method embodiment for managing operation of a user interface in an electronic device, the method includes
- detecting with a sensor user interaction with a sub-portion of an interactive display, the user interaction being; and
- executing with a processing circuit a state change of the interactive display from a low power state to an operational state in response to only one detected user interaction with the electronic device, the user interaction being one of a touch event, a proximity event and a gesture.

According to an aspect of the embodiment the one user interaction is a touch event that includes a movement of the object over a front lens while remaining in contact with the front lens, the front lens separating the sensor from an object that generates the user interaction.

According to an aspect of the embodiment the executing includes determining that a change in detected capacitance exceeds a predetermined level for a portion of the sensor that corresponds with a first soft key region.

According to an aspect of the embodiment the one user interaction is a touch event that includes a movement of the object over a front lens but does not contact the front lens, the front lens separating the sensor from an object that generates the user interaction.

According to an aspect of the embodiment the executing includes determining that a detected proximity pattern caused by the object matches a preregistered proximity pattern within a predetermined amount. The predetermined amount may be an amount of temporal and/or spatial similarity. For example, the similarity of time patterns may be viewed from the perspective of having an object interact with discrete locations on a touch/proximity sensor within certain time frames, as part of a method for detecting a gesture. The predetermined amount may also involve spatial ranges about predetermined points or areas in which interactions with the touch/proximity sensor being observed. Likewise, the predetermined amount may be a range of correlation values, such as 75 to 100%, for example.

According to a non-transitory computer readable storage medium embodiment, the medium has computer readable instructions that when executed by a processing circuit implement a method of managing a user interface in an electronic device, the method includes
- detecting with a sensor user interaction with a sub-portion of an interactive display, the user interaction being; and
- executing with a processing circuit a state change of the interactive display from a low power state to an operational state in response to only one detected user interaction with the electronic device, the user interaction being one of a touch event, a proximity event and a gesture.

The foregoing paragraphs have been provided by way of general introduction, and are not intended to limit the scope of the appended claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
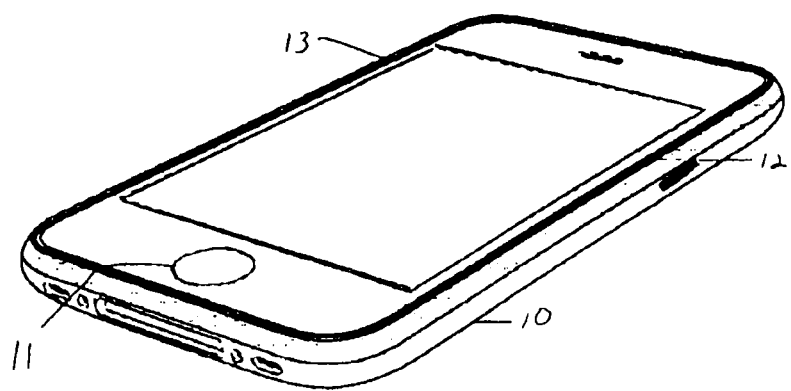
FIG. 1 is a diagram of a conventional mobile terminal.

Referring now to the drawings, wherein like reference numerals designate identical or corresponding parts throughout the several views.

In the description that follows, FIGS. 2A, 2B, 2C, 3 and 4 provide a general system description of component layout and interaction between respective subcomponents of the mobile terminal 100. More detailed descriptions of the display/touch sensor 120 (FIG. 5) and the control circuits that interact with the display/touch sensor 120 will be provided in FIGS. 5 and 6. Subsequent figures describe structures and methods that enable the mobile terminal to operate at a lower power state, yet still allow a user to wake up and unlock the mobile terminal using a single interactive event with a portion of the display/touch sensor 120.

Figure 2A:
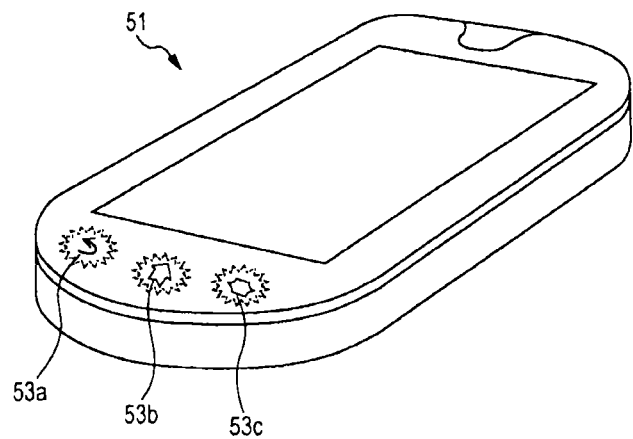
FIGS. 2A, 2B, and 2C are diagrams of exemplary electronic devices in which methods, systems, and computer program product described herein may be implemented.
Figure 2B:
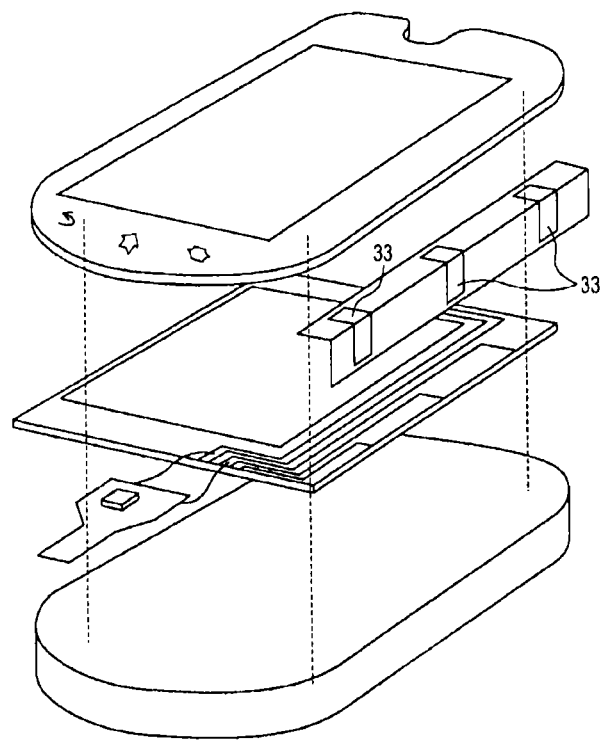

Accordingly, as shown in FIGS. 2A, and 2B one embodiment of the mobile terminal is shown as a smartphone 51 with print screen icons 53*a*, 53*b*, and 53*c* for capacitive keys on a front face of the smartphone, below the display/touch sensor 120. FIG. 2B shows an exploded view of the smartphone 51, with other soft keys implemented with flexible print plates 33 disposed on the side of the smartphone body. A more detailed description of this smartphone embodiment, including its subcomponents is fully described in co-pending, commonly owned U.S. provisional application 61/530, 439, filed on Sep. 2, 2011, the entire contents of which is incorporated herein by reference.

Figure 2C:
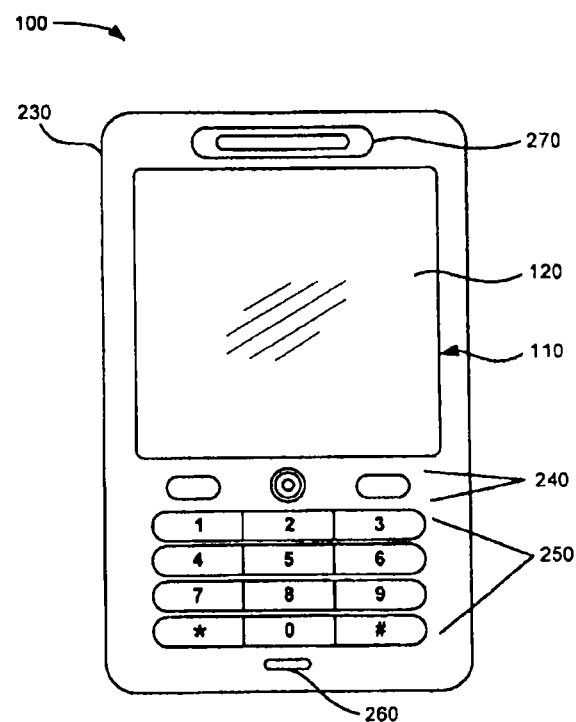

FIG. 2C illustrates another form factor of the mobile terminal 100, in which the, touch panel 120 is integrated with and/or overlaid on display 110 to form a touch screen or a panel-enabled display that may function as a user input interface. The touch panel may further extend to include soft touch keys (e.g., capacitive sensitive keys) that are integrated with the touch panel, but are visually separated from the touch panel so as to appear to a user as a separate area. While two soft touch keys 240 are shown, even more soft touch keys (or areas) may be included either on the same horizontal area as keys 240 or in a matrix of keys 250. Although the front of the mobile terminal includes a dedicated area (sub scan area) for soft touch keys 240, in some embodiments other analog keys may be included as well, such as in the matrix of keys 250.

The touch panel 120 may include near field-sensitive (e.g., capacitive) technology, acoustically-sensitive (e.g., surface acoustic wave) technology, photo-sensitive (e.g., infra-red) technology, pressure-sensitive (e.g., resistive) technology, force-detection technology and/or any other type of touch panel overlay that allows display 110 to be used as an input device. While the term "touch" panel is used, it should be understood that the display need not be physically touched to be sensed by the mobile terminal 100, because the touch panel may be implemented as a proximity display that does not require physical contact to register user interaction as a detectable event. Nevertheless, for the present description, and for convenience, the term touch panel will be used, but it should be understood that the interactive display may also be a proximity display that reacts to a physical presence of an object that does not physically contact a front lens of the display panel.

Generally, touch panel 120 may include any kind of technology that provides the ability to identify multiple touches and/or a sequence of touches that are registered on the surface of touch panel 120. Touch panel 120 may also include the ability to identify movement of a body part or a pointing device as it moves on or near the surface of touch panel 120.

In one embodiment, touch panel 120 may include a capacitive touch overlay including multiple touch sensing points capable of sensing a first touch followed by a second touch. An object having capacitance (e.g., a user's finger) may be placed on or near touch panel 120 to form a capacitance between the object and one or more of the touch sensing points. The amount and location of touch sensing points may be used to determine touch coordinates (e.g., location) of the touch. The touch coordinates may be associated with a portion of display 110 having corresponding coordinates. A second touch may be similarly registered while the first touch remains in place or after the first touch is removed.

In another embodiment, touch panel 120 may include projection scanning technology, such as infra-red touch panels or surface acoustic wave panels that can identify, for example, horizontal and vertical dimensions of a touch on the touch panel. For either infra-red or surface acoustic wave panels, the number of horizontal and vertical sensors (e.g., acoustic or light sensors) detecting the touch may be used to approximate the location of a touch.

In another embodiment, the input mechanism may be implemented with a pressure or force sensitive sensor that detects external forces, such as by way of a stylus or other object that lacks the electric capacity to trigger capacitive touch sensors. Likewise, the sensor may use acoustic pulse recognition that employs transducers attached to the edge of the screen that pick up the sounds of an object touching the screen. Similarly, dispersive signal sensors may be used to detect a piezoelectricity in the cover glass that is responsive to the touch.

Housing 230 may protect the components of electronic device 100 from outside elements. Soft keys 24 may also be used (one the touch panel 120 is in a fully interactive operational state) to permit the user to interact with electronic device 100 to cause electronic device 100 to perform one or more operations, such as place a telephone call, play various media, access an application, etc. For example, control buttons 240 may include a dial button, hang up button, play button, etc. One of control buttons 240 may be a menu button that permits the user to view various settings on display 110. In one implementation, control keys 240 may be user-settable to change function depending on the function being performed by the mobile terminal 100.

Microphone 260 may receive audible information from the user. Microphone 260 may include any component capable of transducing air pressure waves to a corresponding electrical signal. Speaker 270 may provide audible information to a user of electronic device 100. Speaker 270 may include any component capable of transducing an electrical signal to a corresponding sound wave. For example, a user may listen to music through speaker 270.

Figure 3:
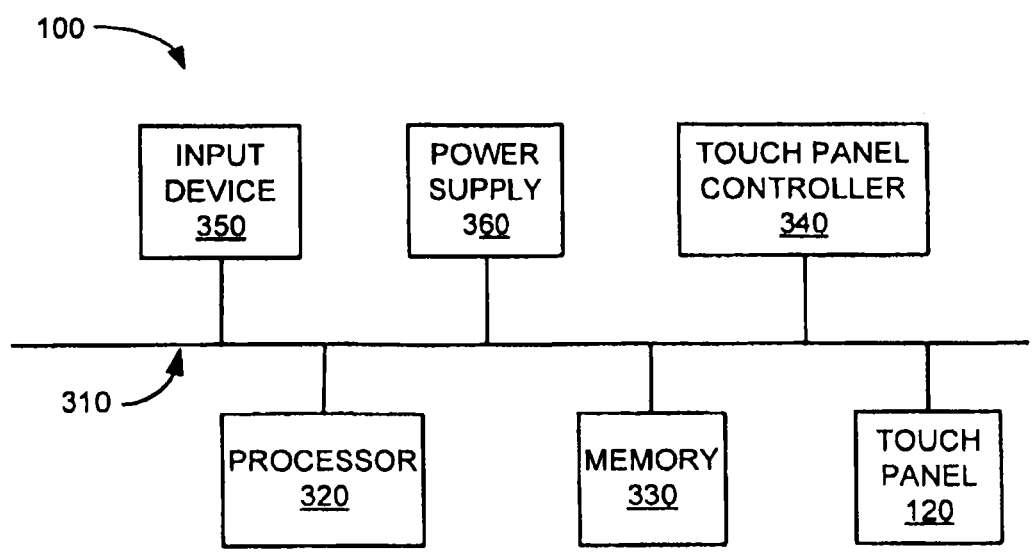
FIG. 3 is a block diagram illustrating components of the electronic device of FIG. 2 according to an exemplary implementation.

FIG. 3 is a block diagram illustrating components of electronic device 100 according to an exemplary implementation. Electronic device 100 may include bus 310, processor 320, memory 330, touch panel 120, touch panel controller 340, input device 350, and power supply 360. Electronic device 100 may be configured in a number of other ways and may include other or different components. For example, electronic device 100 may include one or more output devices, modulators, demodulators, encoders, and/or decoders for processing data.

Bus 310 may permit communication among the components of electronic device 100. Processor 320 may include a processor, a microprocessor, an application specific integrated circuit (ASIC), a field programmable gate array (FPGA), or the like. Processor 320 may execute software instructions/programs or data structures to control operation of electronic device 100.

Memory 330 may include a random access memory (RAM) or another type of dynamic storage device that may store information and instructions for execution by processor 320; a read only memory (ROM) or another type of static storage device that may store static information and instructions for use by processor 320; a flash memory (e.g., an electrically erasable programmable read only memory (EEPROM)) device for storing information and instructions; and/or some other type of magnetic or optical recording medium and its corresponding drive. Memory 330 may also be used to store temporary variables or other intermediate information during execution of instructions by processor 320. Instructions used by processor 320 may also, or alternatively, be stored in another type of computer-readable medium accessible by processor 320. A non-transitory computer-readable medium may include one or more physical or logical memory devices.

Touch panel 120 may accept touches from a user that can be converted to signals used by mobile terminal 100. Touch coordinates on touch panel 120 may be communicated to touch panel controller 340. Data from touch panel controller 340 may eventually be passed on to processor 320 for processing to, for example, associate the touch coordinates with information displayed on display 110.

Touch panel controller 340 may include hardware and/or software-based logic to identify input received at touch panel 120. For example, touch panel controller may identify which sensors may indicate a touch on touch panel 120 and the location of the sensors registering the touch. In one implementation, touch panel controller 340 may be included as part of processor 320.

Input device 350 may include one or more mechanisms in addition to touch panel 120 that permit a user to input information to electronic device 100, such as microphone 260, physical or soft keypad 250, soft touch keys 240, a keyboard, a gesture based device, an optical character recognition (OCR) based device, a joystick, a virtual keyboard, a speech-to-text engine, a mouse, a pen, voice recognition and/or biometric mechanisms, etc. In one implementation, input device 350 may also be used to activate and/or deactivate touch panel 120 or to adjust settings for touch panel 120.

Power supply 360 may include one or more batteries or another power source used to supply power to components of electronic device 100. Power supply 360 may also include control logic to control application of power from power supply 360 to one or more components of electronic device 100.

Electronic device 100 may provide a platform for a user to view images; play various media, such as music files, video files, multi-media files, and/or games; make and receive telephone calls; send and receive electronic mail and/or text messages; and execute various other applications. Electronic device 100 may perform these operations in response to processor 320 executing sequences of instructions contained in a computer-readable medium, such as memory 330. Such instructions may be read into memory 330 from another computer-readable medium. In alternative embodiments, hardwired circuitry may be used in place of or in combination with software instructions to implement operations described herein. Thus, implementations described herein are not limited to any specific combination of hardware circuitry and software.

Figure 4:
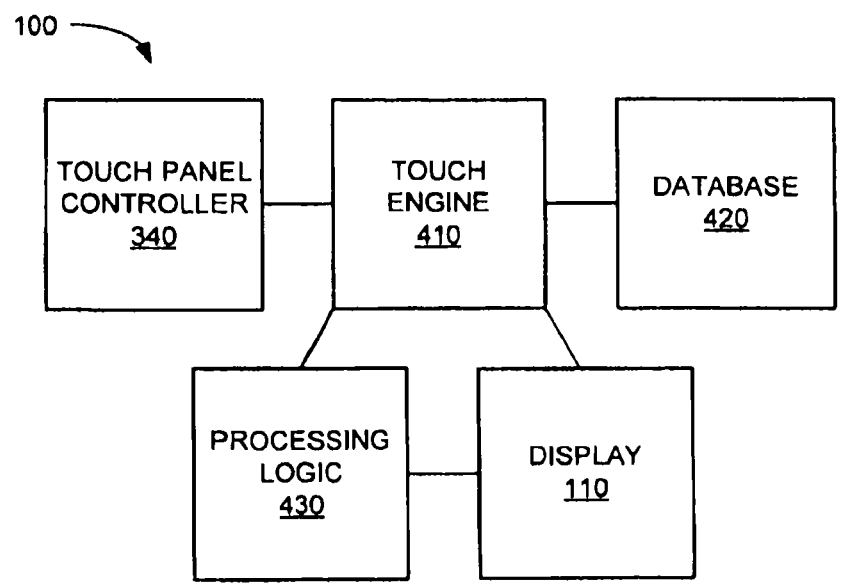
FIG. 4 is a functional block diagram of the electronic device of FIG. 3.

FIG. 4 is a functional block diagram of exemplary components that may be included in electronic device 100. As shown, electronic device 100 may include touch panel controller 340, touch engine 410, database 420, processing logic 430, and display 110. In other implementations, electronic device 100 may include fewer, additional, or different types of functional components than those illustrated in FIG. 4.

Touch panel controller 340 may identify touch coordinates from touch panel 120. Coordinates from touch panel controller 340, including the identity of particular sensors in, for example, the X and Y dimensions, may be passed on to touch engine 410 to associate the touch coordinates with, for example, an object displayed on display 110.

Touch engine 410 may include hardware and/or software for processing signals that are received at touch panel controller 340. More specifically, touch engine 410 may use the signal received from touch panel controller 340 to detect touches on touch panel 120 and determine sequences, locations, and/or time intervals of the touches so as to differentiate between types of touches. The touch detection, the touch intervals, the sequence, and the touch location may be used to provide a variety of user input to electronic device 100.

Database 420 may be included, for example, in memory 230 (FIG. 2) and act as an information repository for touch engine 410. For example, touch engine 410 may associate locations and/or sequences of different touches on touch panel 120 with particular touch sequences stored in database 420. In one implementation, database 420 may store time interval thresholds to identify touch command sequences. For example, a measured time interval between a first touch and a second touch may indicate that the second touch should be associated with the first touch if the measured time interval is below a stored threshold value. Also, database 420 may store lists of touch sequences that may be interpreted differently for particular applications being run on electronic device 100.

Processing logic 430 may implement changes based on signals from touch engine 410. For example, in response to signals that are received at touch panel controller 340, touch engine 410 may cause processing logic 430 to alter the magnification of an item previously displayed on display 110 at one of the touch coordinates. As another example, touch engine 410 may cause processing logic 430 to transfer a file or other information from one electronic folder location to another and to alter display 110 to represent the file transfer. As a further example, touch engine 410 may cause processing logic 430 to alter the magnification of a portion of an image or a particular section of a block of text being shown on display 110. Further description of how a multi-touch control operation for a touch sensitive display may be used according to a device and method described herein is found in U.S. patent application Ser. No. 12/204,324, filed Sep. 4, 2008, the entire contents of which being incorporated herein by reference.

Figure 5:
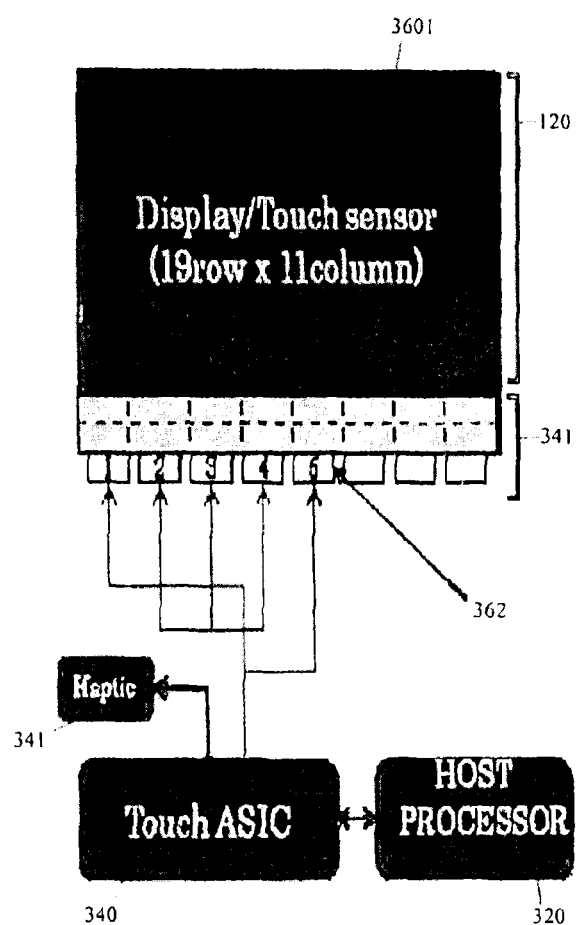
FIG. 5 is a functional layout of a display/touch sensor including a touch key region according to an exemplary embodiment.

FIG. 5 shows an exemplary display/touch sensor 3601 that includes a main, active area region 120 and a sub-touch key region 341. As can be seen by the dashed lines on the display/touch sensor 3601, the regions within the display/touch sensor 3601 are subdivided into different regions. Some of those regions are in the sub-touch key region 341 and others are in the main, active area region 3601 (not shown).

A touch ASIC 340 (part of a touch panel controller) connects to each of the different touch sensor keys (1-5 in FIG. 5) each being supported with LEDs 362 that illuminate when the respective touch sensor key is actuated. Connected to the touch ASIC 340 is a host processor 321 that is a form of a processing circuit (programmable or fixed logic) that performs touch sensor processing as will be discussed in the following paragraphs. Also a haptic device 342 is connected to the touch ASIC, which provides user feedback (perhaps vibration) to inform the user through tactile sensation when a particular touch sensor key is actuated.

Figure 6:
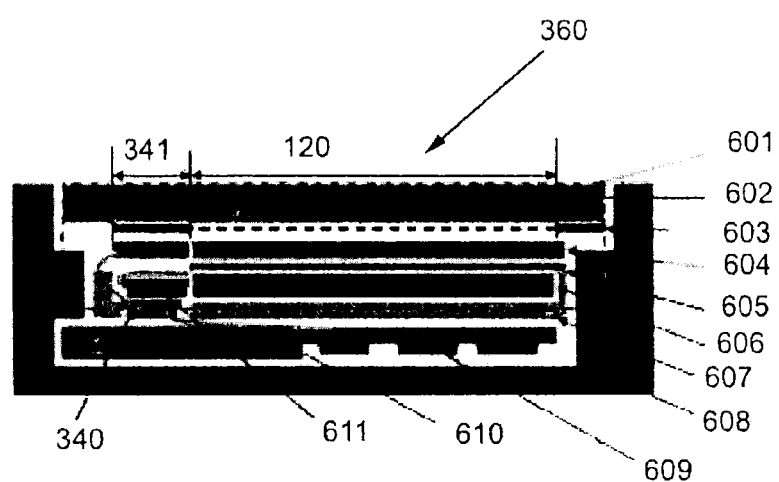
FIG. 6 is a side view illustrating components supporting a sensor sub area and a sensor main area of an apparatus according to the present embodiment.

FIG. 6 shows related components of the display/touch sensor 3601, having a sensor subarea 341 and the sensor main area 120. These areas shown to be within a lens/touch display module 601 that includes as a first layer front glass 602, although they may be separated in other embodiments Graphics (e.g., printed areas that optically block all or part of underlying portions) 603 are shown as black regions in the diagram. A mutual capacitive sensor 604 is common to the sensor subarea 341 and the sensor main area 120. The mutual capacitive sensor 604 is separated from the display 600 by adhesive or lamination material 605. In addition to the lens/touch/display module 601, an outer enclosure 608 encloses a host main circuit board 609, host battery 610, display ASIC 611 and touch ASIC 340 as shown.

The present inventors recognized that by having a common touch/display module that has two sections (sub area and main area), the sub area may be used for implementing distinct keys and thus the functionality of these touch areas may be modified outside of a standard user interface function. Generally, the sub area may be used to implement a number of keys (soft touch keys) that may perform specific functions for a particular application. One such application is triggering a combined wakeup and unlock operation. In this case, when an object (e.g., a user's finger) executes a touch event, the touch ASIC 340 (FIG. 6) informs the first processor 320 (FIG. 5) to interrupt a kernel layer software touch driver to implement a fetch operation. A touch handler then reads the driver buffer memory area and passes the finger touch location data (XYZ) to be examined and determining whether it is a single tap, slide, slow flick, or fast flick gesture, or even a multi-finger slide. This more complicated touch interaction is not easily confused with an accidental excitation of the soft touch keys, and consequently it allows for reliable power up and unlocking of the mobile terminal with high reliability and low likelihood of false positive detection.

To allow for power savings, the touch ASIC 340 cycles between active and inactive scanning periods giving the user the impression of being always ON and ready to respond to a touch event while reducing the average current consumption. Furthermore, to allow power consumption by the host system, the touch ASIC 340 can partly assign certain touch key and handling and analysis without needing to excite or inform the host. Even further power reduction can be achieved by reducing the touch sensor channels being scanned selectively. In this way, it is possible to implement an ON key function using the touch mechanism while further applying power cycling in order to save total system power at the touch ASIC and the host main circuit board 609.

In one embodiment, in the sub area 341 (FIG. 6) icon printing is added to indicate a location of an unlocked slide functionality (see printing 603). To provide a user with feedback that the soft keys have been successfully actuated, one or both keys may be illuminated, or a vibration mechanism may be used to provide tactile feedback.

With regard to how physical operation of touch sensing with a capacitive sensing unit may be used, an exemplary structure is described in U.S. patent application Ser. No. 12/138,782, filed Jun. 13, 2008, the entire contents of which is incorporated herein by reference.

Figure 7:
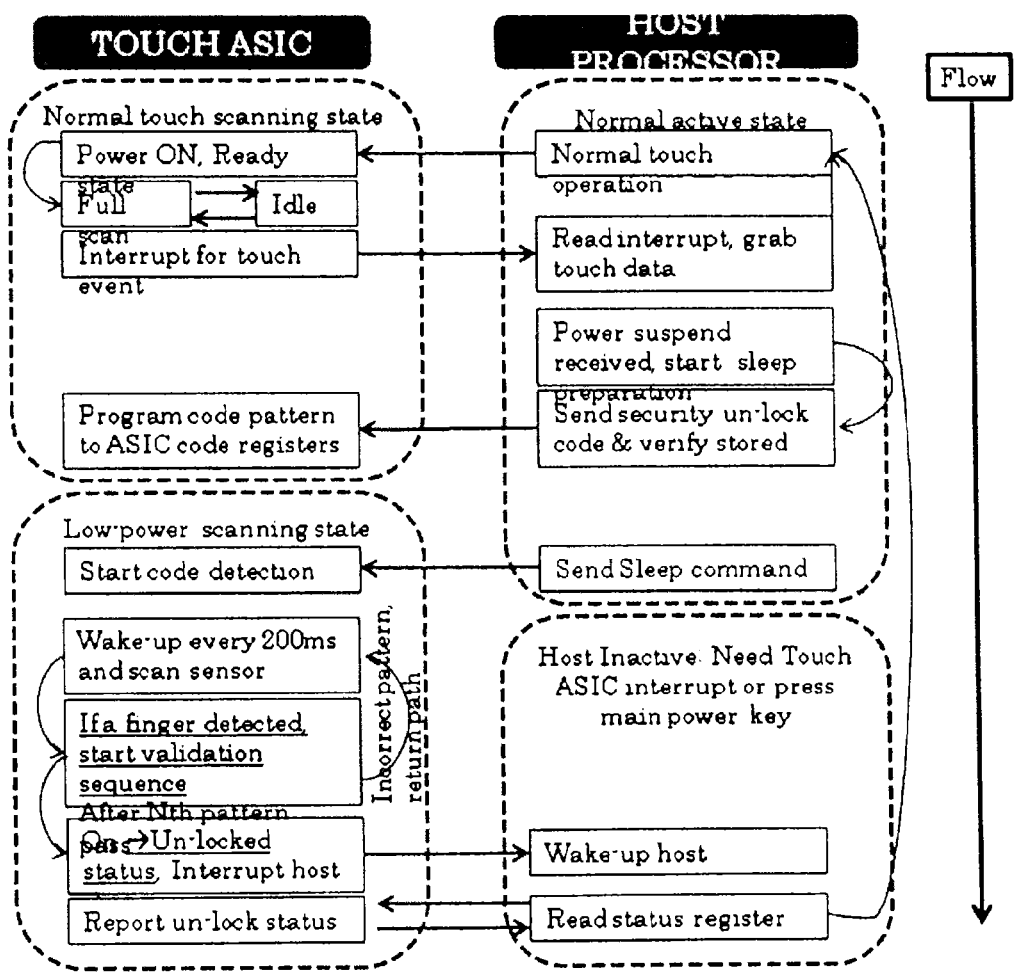
FIG. 7 is a flow chart of a process flow between a touch ASIC and host processor for managing power state and unlocking a mobile terminal according to an embodiment.

FIG. 7 shows an operation security code flow diagram regarding how a programmable security code may be employed via touch scanning to unlock a mobile terminal using reduced power. The process begins with the touch ASIC 340 being in a normal touch scanning state (upper left-hand portion of FIG. 7). The normal touch scanning state operates at a 60 Hz rate which refers to the scanning speed. In an exemplary embodiment a current consumption during normal time input mode consumes about 5 mA. When powered on and in the ready state, the full scan is performed and cycles between the scan operation and an idle state at 60 times per second. The scanning operation searches for an interrupt when a touch event is observed. When the touch event is observed, the process generates an interrupt that is received at the host processor. The host processor reads the interrupt and grabs the associated touch data (e.g., position coordinates, with corresponding grid number, for example). Then, the process proceeds to operation in a normal touch mode when the host processor is in the normal active state. In the normal active state, the host processor remains in coordination with the touch ASIC, which continues to perform the scanning operation, waiting for additional touch input.

However, the host processor goes into a suspend mode when no touch event has been observed for a time greater than X. X may vary, such as one second, one minute, or at a user settable time limit. Once no touch event has been observed for greater than the predetermined amount of time, power is suspended and the start of a sleep preparation is performed, which includes sending a security unlock code along with verification to be stored in a register. This unlock code verification is stored in a touch ASIC, in a code register. This code register would record the pattern of touch interaction or gesture pattern, for example. Subsequently, the host processor sends a sleep command, which places the touch ASIC in a low power scanning state. In the low power scanning state, the touch ASIC operates at a lower scanning rate, e.g., 5 Hz. Correspondingly, the touch ASIC wakes up every 200 milliseconds and scans the sensor to determine whether a finger (or other object) has been detected and begins a validation sequence. If no detectable pattern has been observed, the process flow in the touch ASIC returns to wake up every 20 milliseconds. However, if the validation sequence is observed on the "end pattern pass", the process proceeds to an unlocked status which generates an interrupt that is sent to the host processor. Then it is awoken and performs a receipt of a reporting from the touch ASIC that the unlocked status of the mobile terminal has been achieved. Then the process returns to a normal active state.

Figure 8:
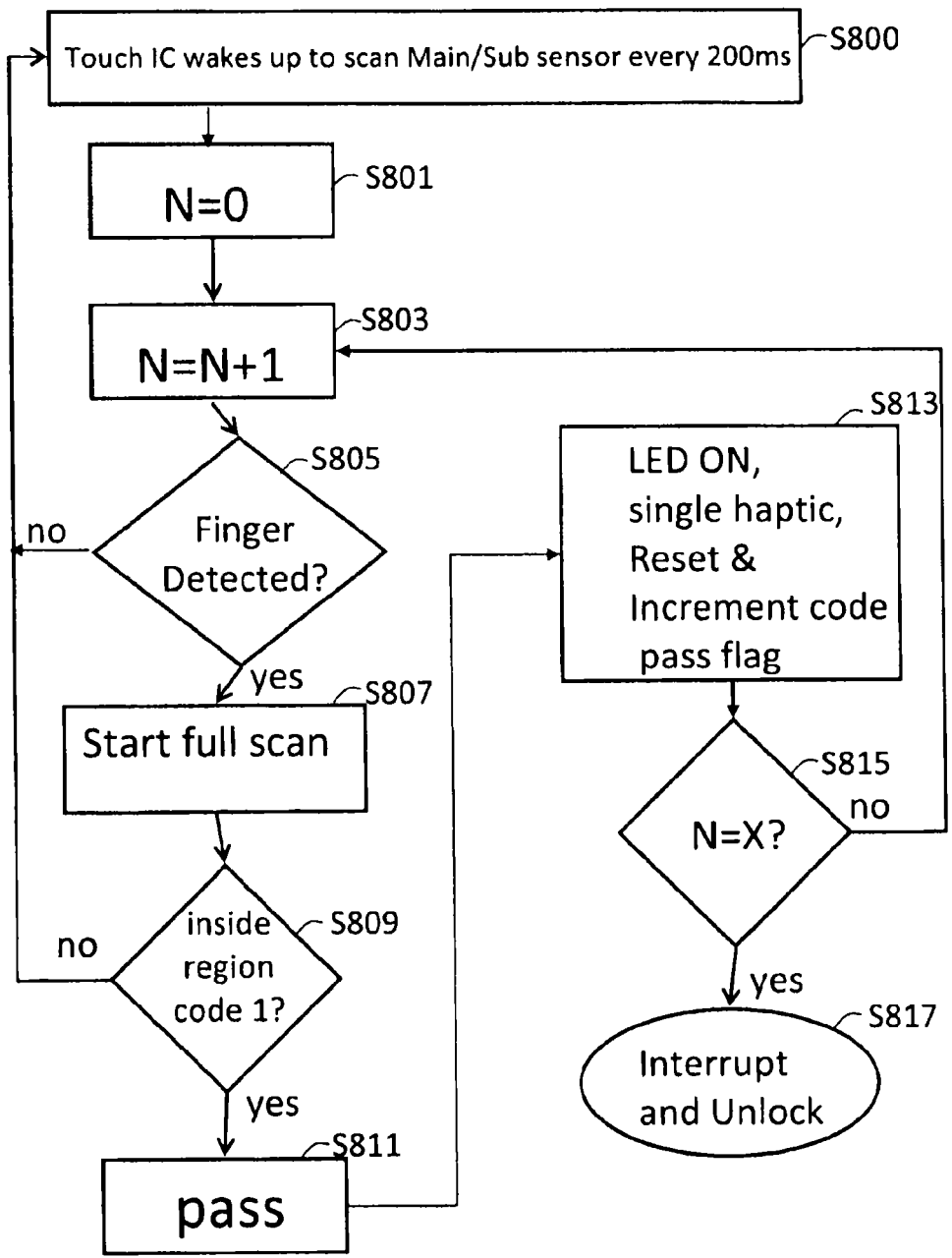
FIG. 8 is a flow chart showing a process flow for determining a false positive and a correct touch/slide/gesture sequence for managing a process for waking up and unlocking the mobile terminal.

FIG. 8 is a process that shows steps employed by the system for unlocking the mobile terminal, touch or movement pattern. The process begins in step S800 where the touch ASIC wakes up to scan the main/sub-sensor every 200 milliseconds. While 200 milliseconds is used in the exemplary embodiment, it should be recognized that a variety of other repetition rates may be employed, for example, as frequently as 200 milliseconds per scan or 1 second per scan. Any particular value in between may also be set. In one embodiment, the scan rate may be user settable between 10 milliseconds and 1 second, depending on the gesture pattern that may be employed by the user for waking up the mobile terminal and placing it into an operational mode. The process then proceeds to step S801 where a count value "N" is set at 0. The counter value is used to keep track of the number of passes of particular touch sensor keys (or areas) that are part of the gesture pattern. In this example, three different touch sensor keys will be used to recognize the pattern. Accordingly, three separate passes are needed and so N will be equal to 3 when the decision is made whether to send an interrupt to unlock the mobile terminal.

After step S801 the N is incremented by one, indicating that the first pass is being performed. The process then proceeds to a query in step S805 where it is determined whether an object is detected as touching (or if a proximity detector is used, in proximity within a predetermined amount to the sensor). If the response is query is no, the process returns to step S800. However, if the response to the query is affirmative, the process proceeds to step S807 where the scan of the relevant main/sub-sensor is performed for a full scan. When the scan is performed, a query is made in step S809 regarding whether the touch (or proximity) event is detected within the first region (particular set of touch sensors that are associated with a soft touch key, for example). If the response to the query in step S809 is negative the process returns to step S800. However, if the response to the query in S809 is affirmative the process proceeds to step S811 wherein the host processor recognizes that the touch event occurred in the location associated with the stored touch or gesture pattern and therefore can provide feedback to the user, an LED associated with that soft key is illuminated, and/or a haptic feedback so the user knows the touch event was successfully recognized by the host processor. This feedback is performed in step S813 and subsequently the process proceeds to step S815.

In step S815 a query is made regarding whether N is equal to a predetermined value, "X". In one embodiment, X would equal 3, indicating that three different soft keys are part of the registered touch pattern or gesture pattern. Because N would equal one at the end of the first pass, the response to query S815 would be negative and therefore the process would return to step S803, where N would be incremented to two. The process would then repeat for a second pass, and then a third pass in this example, so at the end of the third pass, in step S815, the response to the query would be affirmative, which would mean that the touch pattern (or gesture pattern) corresponded with the register pattern sufficiently close, and therefore in step S817 an interrupt would be generated to send to the host processor indicating that the mobile terminal should be woken up and unlocked for user operation.

Once again, this process can be performed through one user step in a reliable way while minimizing the amount of false positive detections. Furthermore, because the analog switch or button could be eliminated, and the touch or proximity sensor is used in a low current state, the system can operate with fewer components and in a lower power state than conventional devices. It also provides the user with a much more convenient experience, so the user can turn on the mobile terminal in a single operation.

Figure 9:
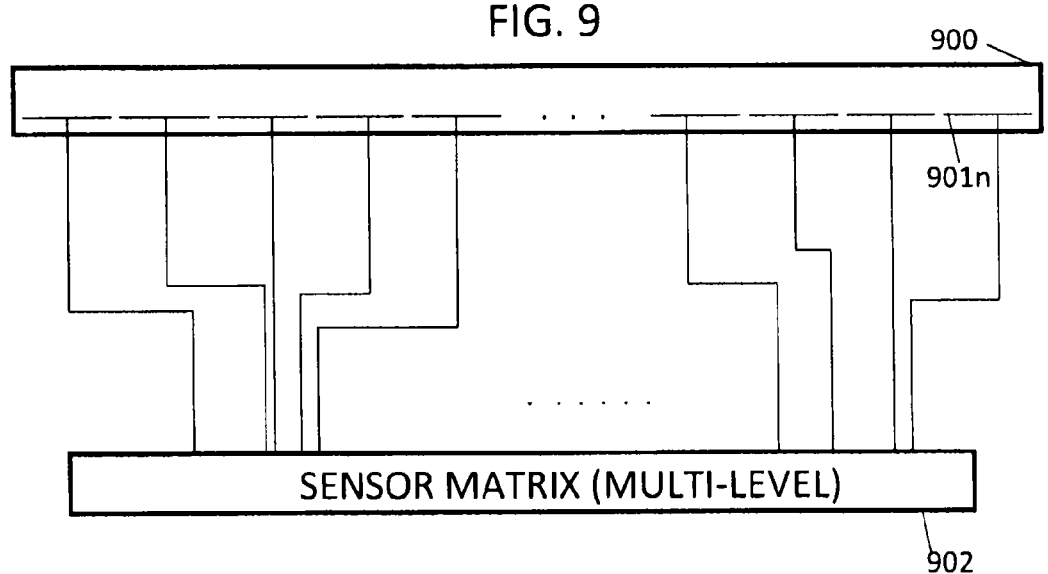
FIG. 9 is an exemplary touch sensor circuit with fine pitch between sensor elements according to an embodiment.

FIG. 9 is a schematic diagram showing how a sensor matrix 902 cooperates with an array of sensors 900, having individual sensing elements 901n. The sensing elements 901 may be capacitive sensing elements, proximity sensing elements, or optical sensing elements for example. The pitch between the different sensing elements is set so that a signature of an object that touches (or in proximity) the front lens will be at least somewhat unique and at least distinguishable against other objects that may touch the sensor and possibly generate a false positive.

Figure 10:
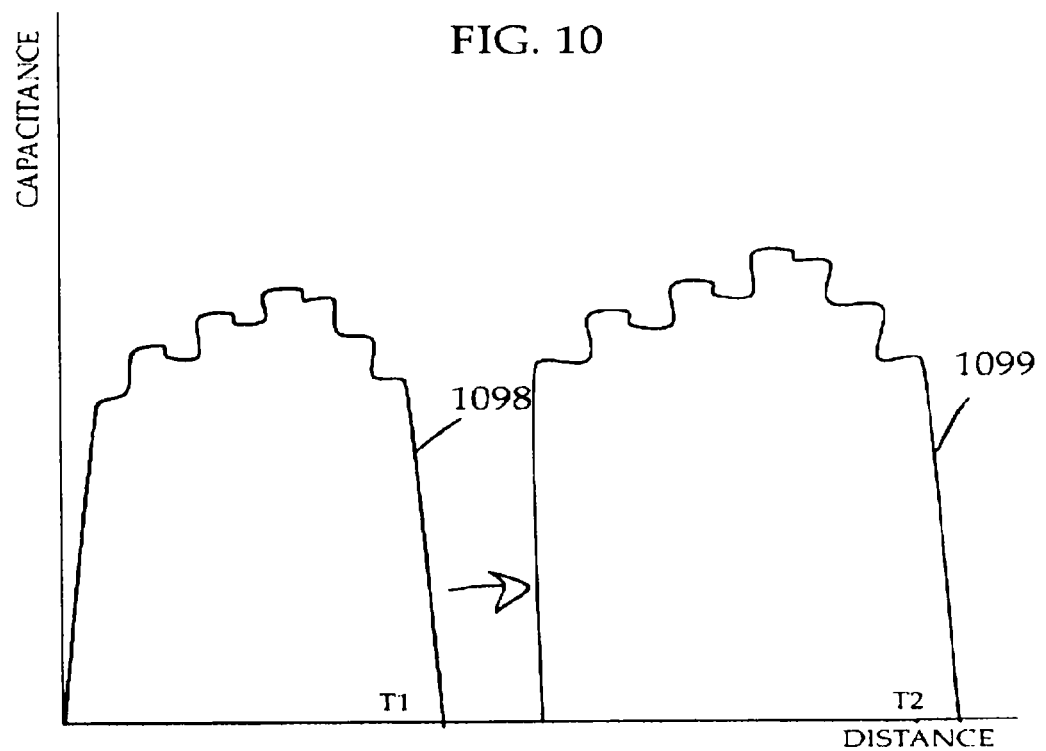
FIG. 10 is a graph showing the capacitive signature of an object that touches the touch sensor.

FIG. 10 is a sensed capacitance distribution caused by a user's finger (or other object) effect on the sensor matrix 902. The first pattern 1098 is the intrinsic capacitance "signature" associated with a user's finger captured at time T1. In this example, the second pattern 1099 is generated by the same figure that has been dragged across the front lens and captured at a time T2. Alternatively, the first pattern 1098 and second pattern 1099 are generated by two of the user's fingers that touch the front lens at the same time (T1=T2). The capacitance distribution (a kind of capacitance signature) is stored in memory and used for comparison against a particular touch event to wake-up the host processor and determine whether the touch event matches the registered capacitance distribution. If so, the mobile terminal is unlocked and readily available for full use by a user without the user performing a second step to unlock the mobile terminal.

If the pitch and levels of resolution of the sensor elements 901n of the array of sensors 900 is sufficient to generate a unique signature for different users, then a user's finger or other object need not be moved to unlock the mobile terminal. Moreover, a single touch and a recognition of the user's capacitance signature will be sufficient to trigger an unlock state. For example, the inherent capacitance distribution imparted by a user's finger is first saved in memory and used for comparison against a particular touch event. The user may also set multiple capacitance signatures (e.g., two or three finger touch pattern) that would also unlock the mobile terminal.

Alternatively, the user may opt to wear gloves that include a particular arrangement of electrodes or other non-dielectric materials arranged in a particular pattern that would make a characteristic capacitance signature pattern. This would permit the use of a lower resolution sensor matrix 902 and would simplify the mobile terminal's recognition of the capacitance distribution that unlocks the terminal. Different gloves may be constructed with different electrode distributions that impart distinct signature patterns to aid in maintaining physical security of the mobile terminal. This may be convenient in winter months when a user is attempting to use the mobile device in cold weather and does not want to remove his or her gloves to wake and unlock the mobile terminal.

While the above description was made in reference to a touch sensor, a similar application applies to a proximity sensor, which does not compel the user to touch the front lens in order to operate the mobile terminal. Moreover a characteristic shape of observed biometric signatures (e.g., vascular structure of a finger) may be used in detecting whether a registered touch event is intended to unlock the mobile terminal.

Figure 11:
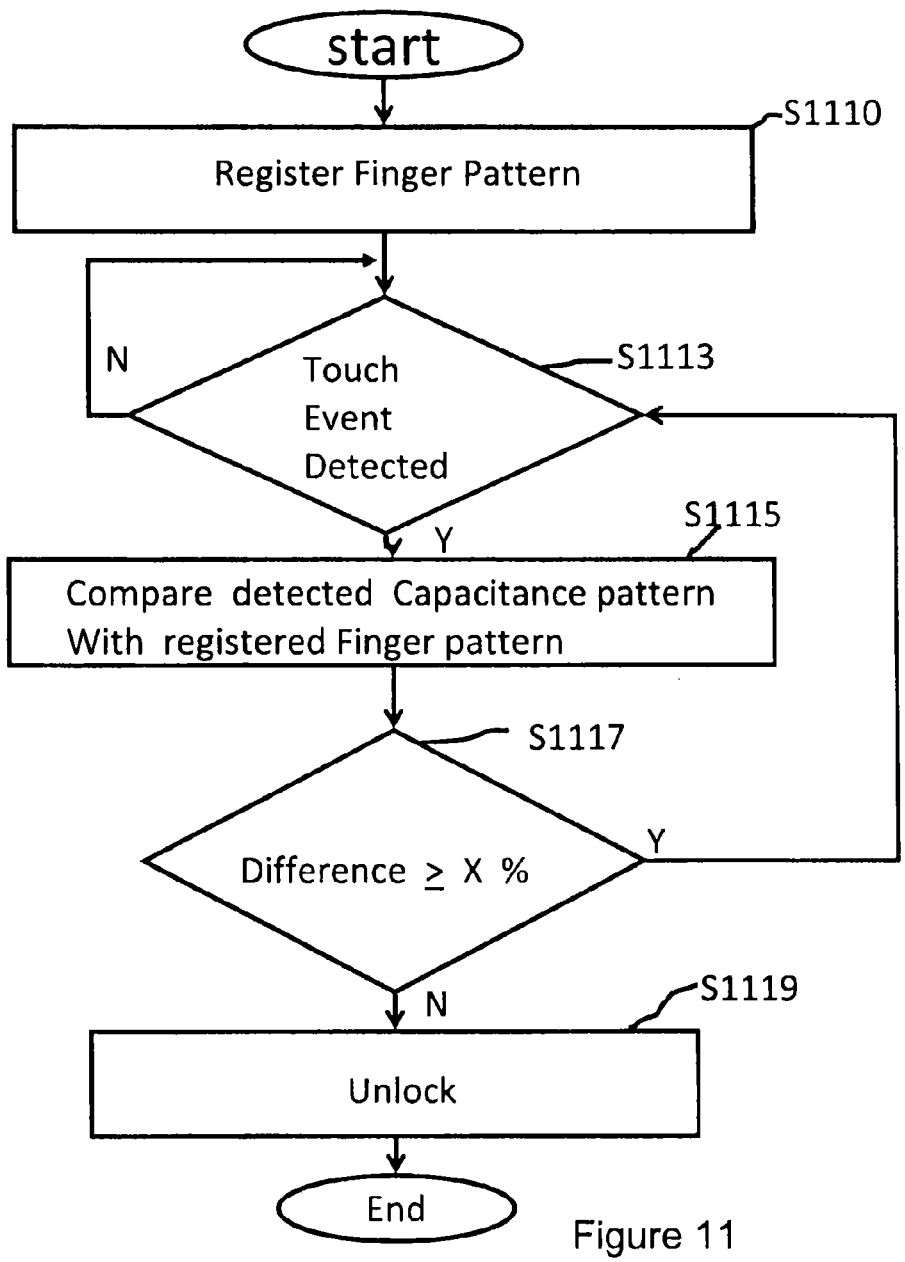
FIG. 11 is a flow chart of a process for registering a touch pattern and unlocking the mobile terminal when the observed touch pattern corresponds with an actual touch pattern.

FIG. 11 is a flow chart showing how a comparison is made between a registered capacitance distribution pattern and a detected capacitance pattern. The process begins in step S1110 where a capacitance pattern for a user's finger (or another object used for touch detection or proximity detection) is registered in memory. The process then proceeds to step S1113 where a query is made regarding whether a touch event is detected (once again the process need not be limited to touch, but proximity detection may also be used). If the response to the query in step S1113 is negative, the process returns in a loop for continuing to monitor for a touch event detection. However if the response to the query is affirmative, the process proceeds to step S1115 where a comparison is made between the detected capacitance pattern and the registered finger pattern. The comparison may be made in a variety of ways, one being on a sensor-by-sensor basis, detecting an absolute or assigned difference, and aggregating the difference results to determine a total difference. The difference then may be compared to the aggregate capacitance contained in the pattern (area under the curve) to normalize the difference. If the difference is determined to be greater than or equal to a predetermined percentage (X percent in step S1117), then it is determined that the pattern is not sufficiently similar to the registered pattern, and therefore the process returns to step S1113. However if the difference is less than X percent, it is determined that the capacitance pattern is sufficiently like that of the registered pattern, and therefore an interrupt is generated to unlock the user interface for the mobile terminal. The unlock step is performed in step S1119. Then the process ends.

There are a variety of ways to compare the detected capacitance pattern with the registered finger pattern. Aside from performing a sensor-by-sensor comparison in determining a difference between the aggregate detected levels verses registered levels for each sensor, another comparison could be made with a cross-correlation operation. Cross-correlation is an operation that measures similarity between two waveforms (in this case capacitance patterns) as a function of time lag applied to one of them. Cross-correlation is particularly useful if a pattern of capacitance changes during the user interaction event, which would be the case when the user performs a gesture with his finger. A cross-correlation could be performed at different resolution levels, one being a sensor-by-sensor resolution, another being on a soft key-by-soft key basis, and a third being on an area-by-area basis where each area includes a group of soft keys. In either case, if a detected gesture pattern or touch pattern that changes over time (usually due to a movement of a user's finger or fingers), that pattern may be detected by comparing a cross-correlation coefficient to a predetermined threshold level (discussed more in reference to FIG. 12). Cross-correlation is performed on the complex conjugate of one function (in this case the registered capacitance pattern) multiplied by the time lag version of the observed (or detected) capacitance pattern.

For both a single touch capacitance pattern, as well as a gesture pattern (changing over time and distance) similar detection patters may be used with proximity detection patterns. Also, rather than single touch events, the same analysis and detection of similarity between registered patterns and detected patterns may be performed on a multi-touch operation.

Figure 12:
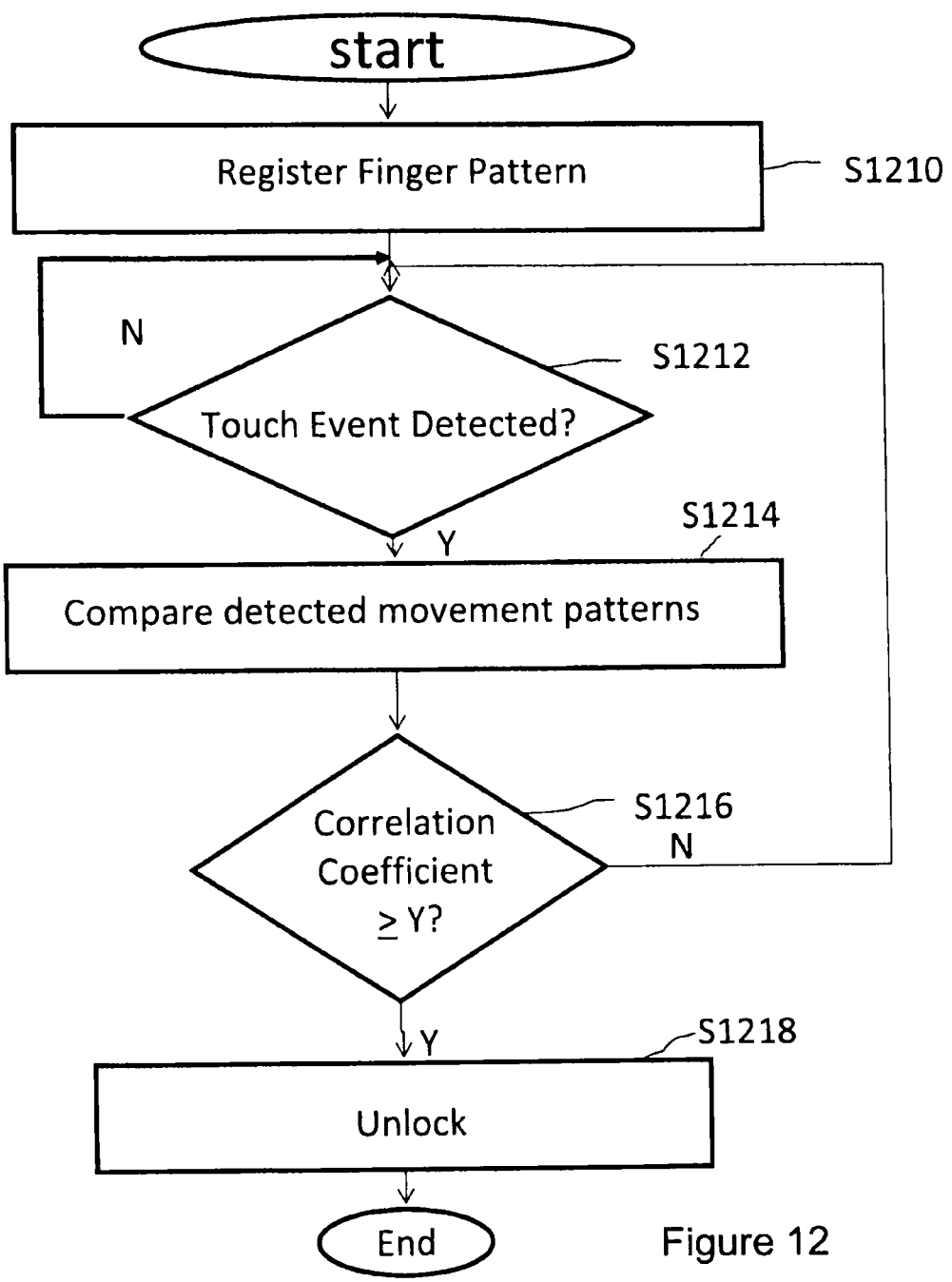
FIG. 12 is a flow chart showing a process for registering a movement pattern and comparing the movement pattern with an actual movement pattern to determine whether there is a match and consequently whether to unlock the mobile terminal.

FIG. 12 provides a more specific example of a comparison of registered and detected movement patterns using correlation. Similar to FIG. 11, FIG. 12 registers the movement in S1210 (regardless of whether it is a touch pattern, proximity pattern, or a multi-touch pattern). The process then proceeds to the query in step S1212 where the touch event (or proximity or multi-touch event) is detected. If the response to the query in step S1212 is negative, the process returns to step S1212 in a loop. However if the result of the query is affirmative, the process proceeds to step S1214 where the comparison of the detected movement pattern with the registered movement pattern is made. Once again this comparison may be in the form of a cross-correlation. A crude form of the cross-correlation was described in FIG. 8, where different passes across different sensors were performed in sequence. However, a more detailed analysis may be performed on a particular sensor-by-sensor basis on a group of touch keys, or even touch key areas.

A two-dimensional cross-correlation may be performed if the movement pattern is not in a straight line (e.g., horizontal) across the sensor area, but rather includes a two-dimensional movement. The two-dimensional cross-correlation (or comparison on a touch area by touch area basis) would be performed by comparing the registered pattern against the observed detection pattern, which would allow for offsets in direction. For example, if a registered pattern was in the form of a Z, the exact location of that Z on the main sensor or on the sub-sensor would be detectable via two-dimensional correlation. Moreover, the two-dimensional correlation would be able to observe a touch event, even if the Z pattern was offset in the longitudinal direction, and/or the horizontal direction. By performing the correlation operation, even if the pattern were elongated relative to the registered movement pattern, the correlation coefficient would still provide a relatively high value if the shape was largely maintained, although elongated or offset in the longitudinal or horizontal direction.

After the comparison step, the process proceeds to step S1216 where it is determined whether the correlation coefficient is greater than or equal to a predetermined value Y. The predetermined value, when normalized, would be something less than one. This correlation coefficient value may be set by the user and could range anywhere between 1 and 0. However if set too high (approaching 1), it would require a very precise tracing of the detected movement pattern on the front lens with the registered movement pattern in order to unlock the mobile terminal. For this reason, the value Y would normally be set to less than one, such as 0.75. A typical operating range would be 0.75 to 0.25. The higher value lowers the likelihood of a false positive detection, but also makes it more challenging for the user to accurately reproduce a gesture that sufficiently matches the stored pattern. Lower values make it easier for the user to reproduce a match, but also increases the likelihood of a false positive detection.

If the response to the query in step S1216 is negative, the process proceeds to step S1212. On the other hand if the response to the query in step S1216 is affirmative, the process proceeds to step S1218 where the mobile terminal is unlocked. Subsequently the process ends.

Obviously, numerous modifications and variations of the present disclosure are possible in light of the above teachings. It is therefore to be understood that within the scope of the appended claims, the disclosed embodiments may be practiced otherwise than as specifically described herein.

The invention claimed is:

1. An electronic device comprising:
an interactive display having a sensor that detects user interaction with a sub-portion of the interactive display; and
a processing circuit configured to change a state of the interactive display from a low power state to an operational state in response to detected user interaction with the electronic device, wherein
the processing circuit is configured to perform the state change after determining that a detected capacitance pattern, caused by an object used to generate the user interaction, matches a preregistered capacitance pattern within a predetermined amount,
the user interaction is a touch event against a surface of the sub-portion of a touch panel display,
the sub-portion being arranged in an adjacent area of a main portion of the interactive display and including a plurality of soft key regions that include at least a first soft key and a second soft key, and
the touch event includes a movement across the soft key regions that include the first soft key region and the second soft key region.

2. The electronic device of claim 1, wherein the sub-portion is disposed at an end portion of the interactive display, and is visually separated from a main display portion of said interactive display by a material that optically covers at least a portion of said sub-portion but not said main display portion.

3. The electronic device of claim 1, further comprising:
a front planar material having an external surface that separates the sensor from the object used to generate the user interaction,
wherein the interactive display being the touch panel, and the sensor being a capacitance sensor that is reactive to the touch event.

4. The electronic device of claim 3, wherein the user interaction is the touch event that includes a movement of said object over said front planar material while remaining in contact with said front planar material.

5. The electronic device of claim 1, wherein the processing circuit determines that the first soft key region is included in the touch event before determining that the second soft key region is included in the touch event.

6. The electronic device of claim 5, wherein the processing circuit determines that the first soft key region is included in the touch event by receiving a signal from the sensor indicating that a change in detected capacitance amount exceeded a predetermined level for a portion of the sensor that corresponds with the first soft key region.

7. The electronic device of claim 3, further comprising:
a storage medium that has data stored therein describing the preregistered capacitance pattern.

8. The electronic device of claim 3, wherein the user interaction is a proximity detection that includes a movement of said object over said front planar material without contacting said front planar material.

9. The electronic device of claim 8, further comprising:
a storage medium that has data stored therein describing a preregistered proximity pattern,
wherein the processing circuit performs the state change after determining that a detected proximity pattern caused by the object matches the preregistered proximity pattern within a predetermined amount.

10. The electronic device of claim 9, wherein the processing circuit performs a cross-correlation operation to determine that the detected proximity pattern caused by the object matches the preregistered proximity pattern within the predetermined amount.

11. The electronic device of claim 3, wherein the user interaction is a multi-point gesture that includes a movement of said object over said front planar material.

12. The electronic device of claim 1, further comprising:
a feedback mechanism that provides a haptic response when the detected user interaction is recognized by the processing circuit as being a user interaction that is associated with a wake up and an unlock instruction.

13. The electronic device of claim 12, wherein said feedback mechanism includes at least one of an illumination device, and a tactile sensation device.

14. A method for managing operation of a user interface in an electronic device comprising:
detecting, with a sensor, user interaction with a sub-portion of an interactive display; and
executing, with a processing circuit, a state change of the interactive display from a low power state to an operational state in response to detected user interaction with the electronic device, wherein
the processing circuit is configured to perform the state change after determining that a detected capacitance pattern, caused by an object used to generate the user interaction, matches a preregistered capacitance pattern within a predetermined amount,
the user interaction is a touch event against a surface of the sub-portion of a touch panel display,
the sub-portion being arranged in an adjacent area of a main portion of the interactive display and including a plurality of soft key regions that include at least a first soft key and a second soft key, and
the touch event includes a movement across the soft key regions that include the first soft key region and the second soft key region.

15. The method of claim 14, wherein the user interaction is a touch event that includes a movement of said object over a front planar material while remaining in contact with said front planar material, said front planar material separating said sensor from the object that generates the user interaction.

16. The method of claim 15, wherein said executing includes determining that a change in detected capacitance exceeds a predetermined level for a portion of the sensor that corresponds with a first soft key region.

17. The method of claim 14, wherein the user interaction is a touch event that includes a movement of said object over a front planar material but does not contact said front planar material, said front planar material separating said sensor from the object that generates the user interaction.

18. The method of claim 17, wherein said executing includes determining that a detected proximity pattern caused by the object matches a preregistered proximity pattern within a predetermine amount.

19. A non-transitory computer readable storage medium having computer readable instructions that when executed by a processing circuit implement a method of managing a user interface in an electronic device, said method comprising:
detecting, with a sensor, user interaction with a sub-portion of an interactive display; and
executing, with a processing circuit, a state change of the interactive display from a low power state to an operational state in response to detected user interaction with the electronic device, wherein
the processing circuit is configured to perform the state change after determining that a detected capacitance pattern, caused by an object used to generate the user interaction, matches a preregistered capacitance pattern within a predetermined amount,
the user interaction is a touch event against a surface of the sub-portion of a touch panel display,
the sub-portion being arranged in an adjacent area of a main portion of the interactive display and including a plurality of soft key regions that include at least a first soft key and a second soft key, and
the touch event includes a movement across the soft key regions that include the first soft key region and the second soft key region.

\* \* \* \* \*